Patented Dec. 3, 1935

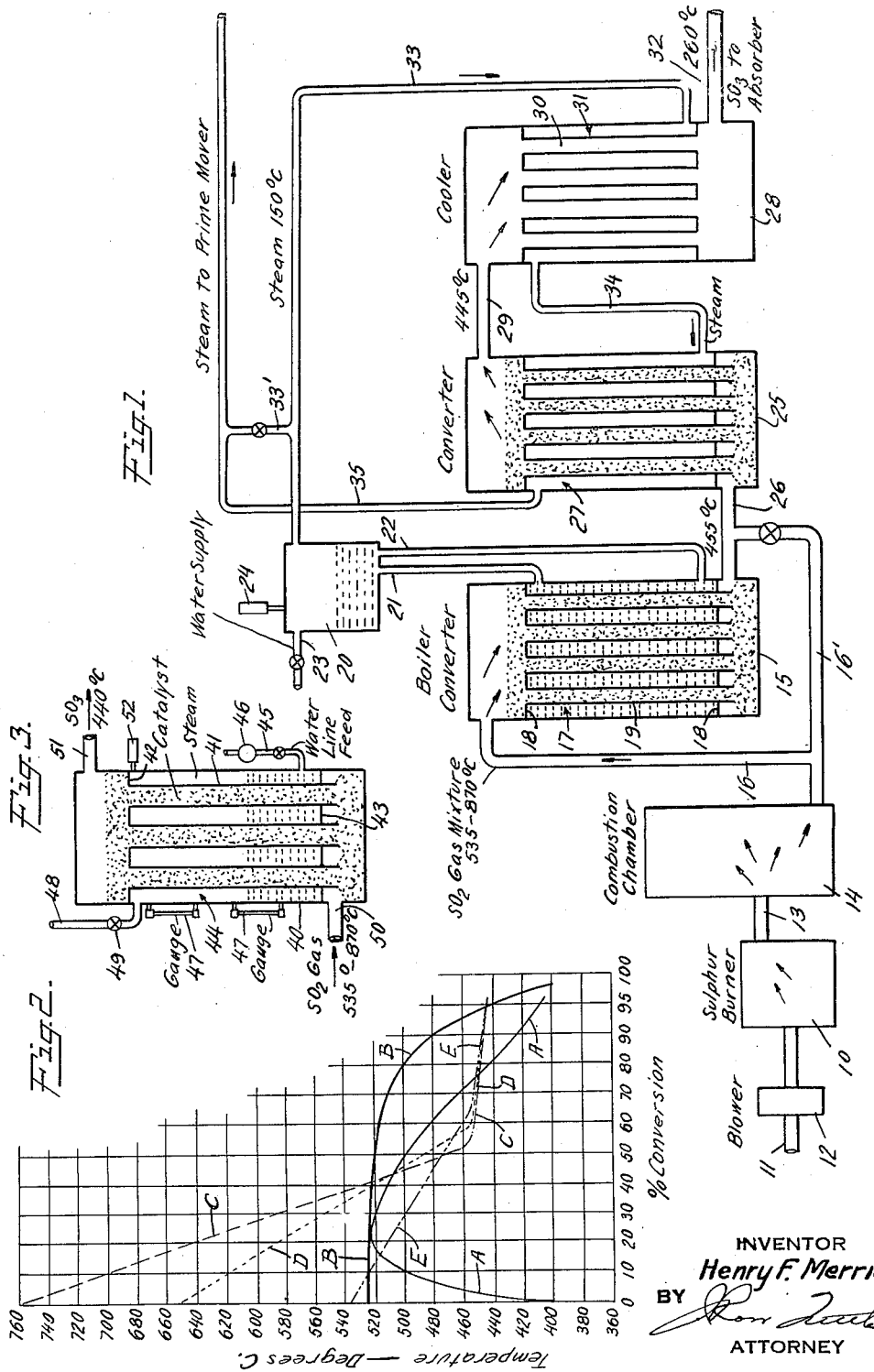

2,023,203

UNITED STATES PATENT OFFICE 2,023,203

PROCESS FOR THE MANUFACTURE OF SULPHURIC ACID

Henry F. Merriam, West Orange, N. J., assignor to General Chemical Company, New York, N. Y., a corporation of New York Application June 24, 1930, Serial No. 463,473

19 Claims. (Cl. 23—176)

The invention relates to catalytic processes and apparatus, and particularly to such as are suitable for the conversion of sulphur dioxide to sulphur trioxide. More specifically the invention is directed to a method and apparatus for the conversion by the contact process of hot sulphur dioxide containing gases, obtained from either a brimstone burner or a sulphide ore roaster, whereby the temperature of the reaction may be controlled and the excess heat developed during the process conserved for application to useful purposes.

According to prior practice, it has been customary to cool hot sulphur dioxide containing gases from a brimstone burner down to about 400° C., a favorable converting temperature, by first passing the gases through a separate waste heat boiler or radiator before introducing the gases into the usual series of converters and heat transferrers to convert the gas to sulphur trioxide. The removal of the heat of reaction during conversion has been effected by circulating air through the heat transferrers. In this mode of operation, it will be evident that the excess heat in the gases from the burner over and above the temperature necessary for conversion, i. e., about 400° C., and the heat of reaction developed in the converters is removed from the gas stream at separate points and in separate pieces of apparatus, that is, the excess heat in the burner gases above about 400° C. is extracted by the waste heat boiler, and the excess heat of the conversion reaction is removed from the reacting gases by the heat transferrers disposed between or associated with the converters. The heat extracted from the burner gases by the waste heat boiler has been utilized economically, usually for the generation of steam. However, the air circulated through the heat transferrers for cooling the gases during the reaction has been vented to the atmosphere. Further difficulty is encountered in the prior practice in the uniform maintenance of the proper temperature throughout the system, particularly in the converters and heat transferrers. Catalytic reactions of the kind referred to are very sensitive to changes in temperature, and careful control of the temperature of the reaction is necessary to obtain the most efficient conversion and to avoid condensation of acid and the consequent corrosion of the apparatus. It is to be observed that, if the excess heat of the gases before their introduction into the first converter and the heat of reaction evolved in the several converters were to be added together, for example, by generating steam in one converter and passing such steam through succeeding converters in heat transfer relation with the catalytic material therein, a high degree of superheat in the steam may be obtained together with a proper temperature control of the reaction with the converters. So far as I am aware, such a combination and concentration of waste heat, and its application to useful purposes has not heretofore been possible.

It is one of the primary objects of this invention to provide a process, particularly applicable to the conversion of sulphur dioxide to sulphur trioxide, whereby the total amount of waste heat of the gases in the entire system, including the excess heat present in the initial sulphur dioxide gases as they come from the burner and heretofore extracted from the gases before their introduction into the first converter and the excess heat developed by the reaction in the converters, may be combined or concentrated, and applied to useful purposes.

It is another particular object of the invention to provide a process by means of which hot burner gases heated to a temperature in excess of the optimum conversion temperature may be cooled down to a favorable conversion temperature simultaneously with the conversion of the sulphur dioxide to sulphur trioxide, and further to provide a process by which this cooling and conversion may be effected in a single unit or piece of apparatus. A further object of the invention lies in the provision of a method for controlling the temperature of the reaction so as to effect an efficient conversion, and at the same time combine and conserve the excess heat in the initial burner gases with the excess heat developed during the reaction. It is another object of the invention to absorb the excess heat of the burner gases and the excess heat of a portion of the catalytic reaction by means of a vaporizable liquid in heat transfer relation with catalytic material in one converter, and then to raise the temperature of the vapor so generated by its utilization as a cooling medium circulating in heat transfer relation with catalytic material in a second converter.

A further object of the invention is to provide suitable apparatus for carrying out the improved process.

Other objects and features of novelty will be apparent from the following description when considered in connection with the accompanying drawing in which:

Fig. I is a diagrammatic illustration, partly in section, of one form of apparatus satisfactory for carrying out the improved process;

Fig. II represents graphically the course of the conversion reaction of sulphur dioxide to sulphur trioxide according to the present invention as compared with a theoretical optimum and the prior practice; and Fig. III illustrates diagrammatically one form of apparatus suitable for carrying out a modification of the improved process.

The air required to support combustion in the sulphur burner 10 and form part of the gas therein is drawn into the converter system through the pipe 11 by the blower 12. The sulphur burner 10 may be of any suitable type adapted to operate under plus pressure. Gases from the burner are discharged through the pipe connection 13 into the combustion chamber 14. In the combustion chamber the complete oxidation of any volatilized sulphur takes place. Gases leaving the combustion chamber are led into the upper end of the boiler-converter 15 through the conduit 16.

The converter 15 may be of any suitable construction arranged so that the contact mass therein is supported in heat transfer relation with a heat absorbing vaporizable liquid, such as water, circulated through the jacketed section 17. For example, in the construction diagrammatically illustrated, the converter may consist of an elongated cylindrical shell having the spaced tube sheets 18 attached to the shell, thus forming with the shell and the exterior of the catalyst tubes 19 the jacket or heat transferrer section 17. The tubes 19 are set into the tube sheets 18 in the manner usual in boiler construction. The transferrer section 17 of the boiler-converter 15 is connected to the steam drum 20 through the pipes 21 and 22 attached respectively to the upper and lower ends of the transferrer section. The drum 20 may be of any desirable form or construction, and should be of such size as to provide a sufficiently large water and steam space therein. Water is supplied to the drum 20 through the valved inlet pipe 23 by means of a suitable injector not shown. The reference character 24 represents a safety valve which may be adjusted to hold any desired pressure and temperature of the steam within the drum 20.

After passing through the boiler-converter 15, the partially converted gases are led into the bottom of the converter 25 through the conduit 26. The construction of the converter 25 may, with the exception of the pipe connections with the jacket section 27, for the purposes of this invention be considered the same as the boiler-converter 15. After passing upwardly through the catalyst in the tubes of the converter 25, the gases are conducted to the upper end of the cooler 28 through the pipe connection 29.

The cooler 28 may be any suitable type of heat transferrer preferably arranged for countercurrent passage of two fluids in heat exchange relation with each other. However, for convenience it may be considered that the construction of the cooler is the same as that of the converters 15 and 25, with the difference, of course, that the tubes 30 of the transferrer section 31 contain no catalytic material, and are open for the free passage downwardly of treated gases from the upper end of the cooler to the outlet pipe 32 by means of which the sulphur trioxide is conducted to the usual absorbers.

It will be apparent that the passage of the gas through the separate units or pieces of apparatus of the system including the converters and cooler is maintained by the blower 12.

The steam drum 20 is connected through the pipe 33 to the lower end of the jacket section 31 of the cooler 28. The upper end of the jacket section 31 of the cooler is connected to the lower end of the jacket section 27 of the converter 25 by the pipe 34. The upper end of the transferrer section 27 of converter 25 is connected to an outlet pipe 35, by means of which steam leaving the converter 25 may be conducted to some other part of the plant for use as desired. Pipe 33 and the outlet pipe 35 are connected by the valved by-pass 33'.

The operation of the improved method and apparatus is as follows:

Air, previously dried if desired, is drawn in through the pipe 11 and injected into the sulphur burner 10 by the blower 12. This air supports the combustion of brimstone in the burner 10 and forms part of the resulting gas passing into the combustion chamber 14 where complete oxidation of any volatilized sulphur takes place. Hot gases from the combustion chamber 14, containing ordinarily 7% to 12% sulphur dioxide, enter the top of the boiler-converter 15 at temperatures ranging from 535° C. to 870° C. or higher. The tubes 19 of the converter are filled with a suitable catalytic material preferably in the form of pellets. Notwithstanding the high temperatures at which the gases enter the converter 15, when operating according to this invention a large percentage of the total conversion is obtained in the first converter. The percentage of conversion in boiler-converter 15 depends largely upon the quantity of catalytic material employed, the length of the tubes, time of contact of the gas and the catalyst, and the temperature conditions maintained in the converter. If a sulphur dioxide gas mixture heated to a high temperature, say for example 760° C., is introduced in a converter and the reaction permitted to proceed with the removal of no more heat than that generated by the reaction itself, it is possible to obtain in the said converter about a 40% conversion to sulphur trioxide. However, by operating according to the present invention, and removing more heat from the gas than the amount of heat evolved during the reaction in the said converter, a greater conversion percentage may be obtained, as will be seen from an inspection of the illustrative curve C in Fig. II.

Fig. II illustrates graphically the temperatures and the corresponding percentage of conversion of sulphur dioxide to sulphur trioxide prevailing at different stages in the present process as compared with a theoretical optimum and the prior practice. The solid curve A represents approximately the temperature gradient and percent of conversion in processes operating according to prior practice; that is, where the sulphur dioxide gases are introduced into the first converter of a system at a temperature of approximately 400° C. It will be seen that there is an initial rapid rise in the temperature, on account of the comparatively large quantities of heat liberated in the first stages of conversion. The temperature of the reacting gases is subsequently decreased by coolers and heat exchangers so as to obtain an economical conversion of sulphur dioxide to sulphur trioxide. Solid curve B, according to Lewis and Ries in an article appearing in Industrial & Engineering Chemistry, June 1925, page 593, shows an optimum temperature gradient which, if obtainable in practice, would theoretically produce the most efficient conversion. The dotted curves C, D, and E approximately represent the temperatures and corresponding percentages of conversion when, according to the present invention, hot burner gases are introduced into the converter 15 at the temperatures of approximately 760° C., 650° C., and 535° C. In these instances it will be noted that the burner gas is introduced into the converter at temperatures much higher than has been customary in the prior practice, i. e., 400° C., and also in excess of the optimum initial temperature, i. e., about 525° C., as indicated by the curve B.

Large quantities of the initial heat of the burner gases and the excess heat developed during the exothermic reaction within the body of the catalyst in the converter 15 are absorbed by the water circulated around the tubes in the transferrer section, with the resultant generation of large quantities of steam. For economic reasons the liquid in the transferrer section is water, but obviously other vaporizable liquids such as mercury or diphenyl may be used. The pressure in the drum 20 and consequently the temperature of the steam or other gaseous fluid in the drum may be regulated with reference to the boiling point of the liquid used by suitable adjustment of the valve 24. It has been found that the temperature of the steam in the drum 20 should be not materially less than 150° C. so that the temperature of the steam subsequently introduced into cooler 31 as a cooling medium will be above the dew point of sulphuric acid in an $SO_3$ gas produced from a dried burner gas to avoid condensation of acid therein.

After passing through the converter 15, the partially converted gases are led into the lower end of the second converter 25 through the pipe 26. The temperature of the gases entering the converter 25 is preferably about 455° C. In some instances the cooling of the gases in the boiler-converter may be too great for most efficient conversion in the second stage and in this circumstance the temperature of the gas entering converter 25 may be raised by introducing into connection 26 a small quantity of hot gas through the valved by-pass 16'. After passing through the catalyst in the converter 25, the conversion of sulphur dioxide to sulphur trioxide will be approximately 96% or higher, and the gas then passes into the cooler 28 through the pipe 29.

During the passage of the gases through the second converter, more heat will be evolved, and the temperature of the gases will be increased on account of the continuance of the reaction within the catalyst tubes. The cooling medium required for circulation in the transferrer section 27 of the second converter is the steam generated in the converter 15. Steam may be supplied directly to the lower end of the transferrer section 27 of the converter 25 from the drum 20 through a pipe connection not shown, or, as in the preferred form of the invention, the steam from the drum 20 may be previously passed through the cooler 28 by means of the pipe connections 33 and 34. The passage of the cooling medium through the transferrer section 27 of the second converter should preferably be co-current with the flow of the gases passing through the tubes. This will permit the conversion reaction to be carried out in a long zone of catalyst, which may by this means be kept at a substantially uniform temperature. Thus, the converted gas leaves the upper end of the converter 25 at a temperature of approximately 445° C., and the temperature of the cooling medium at the outlet of the transferrer jacket 27 will have been increased by the amount of heat extracted from the gases passing through the converter 25 and the cooler 28. Hence, it will be apparent that the temperature of the steam generated in the boiler-converter 15 will be materially increased whether the steam is passed directly from the drum 20 through converter 25, or first through the cooler 28 and then through converter 25.

However, when operating according to the preferred embodiment of the invention, steam from the drum 20 is introduced into the lower end of the transferrer section 31 of the cooler 28. The direction of the passage of the steam through the cooler is countercurrent to the flow of the sulphur trioxide containing gases passing downwardly through the tubes 30. By this arrangement the temperature of the sulphur trioxide gases is reduced from about 445° C. to approximately 260° C., and the temperature of the steam is raised in accordance with the degree of cooling of the sulphur trioxide containing gases. By introducing the steam previously superheated in the cooler into the second converter, more uniform temperatures may be obtained therein because the flow of the steam through the apparatus may be so controlled by the valve in the by-pass 33' that the temperature of the steam introduced into the lower end of the transferrer section 27 may be very nearly the temperature at which it is desired to maintain the reaction in the tubes of the converter 25. The temperature of the steam on leaving the transferrer section through the outlet pipe 35 is further superheated by the amount of heat extracted from the gases during passage through converter 25. In situations where more steam is generated in the drum 20 than is necessary for circulation through cooler 28 and converter 25, the excess may be led directly into the outlet 35 through the by-pass 33'. In cases where the fluid cooling medium generated in the drum 20 is not adaptable for general use, it may be condensed after withdrawal from outlet 35 and returned to the drum 20, the heat released in the condenser being utilized as desired.

The sulphur trioxide gas leaving the cooler 28 is conducted to absorbers through the pipe 32.

As previously suggested, when it is desired to omit the cooler 28 from the steam circuit, steam from the drum 20 may be passed directly to the lower end of the transferrer section 27 through a pipe connection not shown, and the pipe line 29, including therein any suitable form of cooler, should then be connected to the absorbers. However, the economic advantages of the use of the cooler 28 is a unit of the system will be readily apparent from the foregoing description.

The improved process is also adaptable for the conversion of hot burner gases obtained by the roasting of sulphide ores. If it is desired to treat gases from such source, the sulphur burner and the combustion chamber shown in the drawing will, of course, be displaced by a roasting furnace and a dust chamber respectively.

It will be observed that according to one phase of the invention, the cooling of the burner gases down to the proper conversion temperature and the removal of the greater portion of the excess heat of the reaction is accomplished in a single piece of apparatus, i. e., in the boiler converter 15. The advantage of this from both an engineering and an economic standpoint will be readily apparent. By the operation of the process and apparatus as thus far described, it will be seen that the total amount of waste heat of the gases in the entire system, including the excess heat present in the burner gases before their introduction into the first converter and the excess heat of reaction evolved in all the converters, may be added together by generating steam in the boiler converter, and subsequently superheating the steam by employing it as a cooling medium in subsequent converters and heat interchangers with the result that greater quantities of more highly heated steam are available for useful purposes.

Fig. III represents diagrammatically one form of apparatus suitable for carrying out a modification of the improved process. The construction of the boiler-converter 40 may, with the exception of the water and gas connections, be considered the same as that of the boiler-converter 15. The shell, the exterior of the tubes 41, together with the upper and lower tube sheets 42 and 43, form the jacket or heat transferrer section indicated generally at 44. The transferrer section 44 is adapted to contain water or other vaporizable liquid supplied thereto from the water inlet conduit 45 including therein an automatic injector indicated diagrammatically at 46. The several gauges 47 disposed in staggered relation about the circumference of the shell facilitate the determination of the water level in the transferrer section 44. The steam outlet 48, having therein the pressure control valve 49, is connected to the transferrer section 44 adjacent its upper end. Gas to be treated is introduced into the converter through the inlet 50 and discharged through the outlet 51. The numeral 52 indicates a standard safety valve. The catalytic material is disposed within the tubes 41 as in the converters 15 and 25.

The modification of the improved process may be carried out in the apparatus just described in such manner that the coversion of the gases is completed in one converter. This is made possible, notwithstanding the high temperature of the sulfur dioxide gas at the time of its introduction into the converter, because of the arrangement disclosed which permits ready adjustment of the liquid level in the transferrer section 44.

The sulphur dioxide containing gas is introduced into the converter through the inlet 50 at temperatures ranging from about 535° to 870° C., or higher. The gases enter the converter at the bottom and pass upwardly through the tubes. Thus, it will be seen that as the lower ends of the tubes are surrounded by liquid, large quantities of heat may be removed from the gases during passage of the same through the hottest part of the reaction zone. Conversion is initiated and completed in the tubes, and the sulphur trioxide containing gases leave the converter through the outlet 51 at a temperature around 440° C. The excess heat of the burner gases and the excess heat of the catalytic reaction are absorbed and utilized in the generation of large quantities of superheated steam which leaves the apparatus through the outlet 48 and is conducted to other parts of the plant and applied to such useful purposes as desired. The gases from the outlet 51 are sufficiently cooled and conducted to the usual absorbers not shown.

The temperature of the reaction in the tubes may be controlled by variation of the water level in the transferrer section 44, and by regulation of the pressure of the steam in the transferrer section by adjustment of the pressure valve 49. For any given inlet temperature of the sulphur dioxide gases, the water level in the transferrer section may be determined in accordance with operating conditions, and thereafter maintained by the automatic injector 46. In a similar manner the temperature of the catalyst in those portions of the tubes which are surrounded by steam may be controlled by regulation of the valve 49. Devices such as the injector 46 and the pressure regulating valve 49 are obtainable in the market, and hence detailed description of such is unnecessary.

It will be observed that according to this modification of the invention, the cooling of the burner gases down to the proper conversion temperature, the removal of the excess heat of the reaction and the complete conversion of the gases is accomplished in a single piece of apparatus. This may be effected because of the flexibility of temperature control obtainable in the boiler-converter 40 by variation of the level of the cooling liquid in the transferrer section, and by regulation of the pressure of the vapor in the transferrer section above the liquid level.

I claim:

1. The method of effecting a gas phase exothermic catalytic reaction which comprises passing a gas containing a convertible constituent heated to a reactive temperature in contact with a body of catalytic material adapted to cause the conversion of the convertible constituent and disposed in heat transfer relation with a vaporizable liquid whereby the liquid is vaporized and heat removed from the gas, then passing the gas into contact with a second body of catalytic material, and removing heat of reaction therefrom by passing said vapor in heat transfer relation with the second body of catalytic material.

2. In the method of effecting a gas phase exothermic catalytic reaction in a plurality of stages, the steps which comprise removing heat from the first stage of the reaction by vaporizing a liquid disposed in heat transfer relation with the catalytic material in the first stage, and using the vapor to cool catalytic material in a second stage.

3. In the process of converting sulphur dioxide to sulphur trioxide wherein hot gases from a source of sulphur dioxide are passed successively through a plurality of units of a system, the method of conserving the waste heat of the gases passing through the system which comprises passing a fluid medium in heat transfer relation with hot gases at one point in the system to extract waste heat from the gases, and then passing the heated fluid medium in heat transfer relation with hot gases heated to temperature in excess of that of said heated fluid, at another point in the system thereby adding to such fluid the combined effect of the excess heat extracted from the gases.

4. The process of converting sulphur dioxide to sulphur trioxide which comprises passing a sulphur dioxide containing gas heated to a reactive temperature into contact with a body of catalytic material adapted to cause conversion of sulphur dioxide to sulphur trioxide and disposed in heat transfer relation with a vaporizable liquid, whereby the liquid is vaporized and heat removed from the gas, then passing the gas into contact with a second body of catalytic material, and removing heat of reaction therefrom by passing said vapor in heat transfer relation with said second body of catalytic material.

5. The process of converting sulphur dioxide to sulphur trioxide which comprises passing a sulphur dioxide containing gas heated to a reactive temperature into contact with a body of catalytic material adapted to cause conversion of sulphur dioxide to sulphur trioxide and disposed in heat transfer relation with a body of water, whereby steam is generated and heat removed from the gas, then passing the gas into contact with a second body of catalytic material, and removing heat of reaction therefrom by passing said steam in heat transfer relation with said second body of catalytic material.

6. The process of converting sulphur dioxide to sulphur trioxide which comprises passing a sulphur dioxide containing gas heated to a reactive temperature into contact with a body of catalytic material adapted to cause conversion of sulphur dioxide to sulphur trioxide and disposed in heat transfer relation with a vaporizable liquid, whereby the liquid is vaporized and heat removed from the gas, then passing the gas into contact with a second body of catalytic material to complete the conversion, cooling the converted gas by associating said vapor therewith in heat transfer relation, and then removing heat of reaction from said second body of catalytic material by passing said vapor in heat transfer relation therewith.

7. The process of converting sulphur dioxide to sulphur trioxide which comprises passing a sulphur dioxide containing gas heated to a reactive temperature into contact with a body of catalytic material disposed in heat transfer relation with a body of water, whereby steam is generated and heat removed from the gas, then passing the gas into contact with the second body of catalytic material to complete the conversion, cooling the converted gas by associating said steam therewith in heat transfer relation, and then removing heat of reaction from said second body of catalytic material by passing said steam in heat transfer relation therewith.

8. The process of converting sulphur dioxide to sulphur trioxide which comprises passing a sulphur dioxide containing gas heated to a reactive temperature into contact with a body of catalytic material disposed in heat transfer relation with a vaporizable liquid, whereby the liquid is vaporized and heat removed from the gas, then passing the gas into contact with a second body of catalytic material, and removing heat of reaction therefrom by passing said vapor in heat transfer relation with said second body of catalytic material co-currently with the flow of the gas passing through the catalytic material.

9. The process of converting sulphur dioxide to sulphur trioxide which comprises passing a sulphur dioxide containing gas heated to a reactive temperature into contact with a body of catalytic material disposed in heat transfer relation with a body of water, whereby steam is generated and heat removed from the gas, then passing the gas stream into contact with a second body of catalytic material, and removing heat of reaction therefrom by passing said steam in heat transfer relation with said second body of catalytic material co-currently with the flow of the gas passing through the catalytic material.

10. The process of converting sulphur dioxide to sulphur trioxide which comprises passing a sulphur dioxide containing gas heated to a reactive temperature into contact with a body of catalytic material disposed in heat transfer relation with a body of water, whereby steam is generated and heat removed from the gas, then passing the gas into contact with a second body of catalytic material to complete the conversion, cooling the converted gas by passing the gas and the steam counter-currently in heat transfer relation, and then removing heat of reaction from the second body of catalytic material by passing the steam in heat transfer relation with the second body of catalytic material co-currently with the flow of the gas passing through the catalytic material.

11. In the conversion of sulphur dioxide to sulphur trioxide wherein hot gases from a source of sulphur dioxide are passed through a plurality of converters arranged in series, the steps which comprise generating vapor by maintaining a body of fluid in heat transfer relation with a body of catalytic material in one converter, and then raising the temperature of the vapor so generated by passing said vapor in heat transfer relation with catalytic material in a second converter.

12. In the conversion of sulphur dioxide to sulphur trioxide wherein hot gases from a source of sulphur dioxide are passed through a plurality of converters arranged in series, the steps which comprise generating steam by maintaining a body of water in heat transfer relation with a body of catalytic material in one converter, and then raising the temperature of the steam so generated by passing said steam in heat transfer relation with catalytic material in a second converter.

13. In the conversion of sulphur dioxide to sulphur trioxide wherein hot gases from a source of sulphur dioxide are passed through a plurality of converters and a cooler, the steps which comprise generating steam by maintaining a body of water in heat transfer relation with a body of catalytic material in one converter, raising the temperature of the steam by passing said steam through the cooler in heat transfer relation with the gases passing therethrough, and further raising the temperature of said steam by passing it through a second converter in heat transfer relation with the catalytic material therein.

14. In the process of converting sulphur dioxide to sulphur trioxide wherein hot gases from a source of sulphur dioxide are passed successively through a plurality of units of a system, the method of conserving the waste heat of the gases passing through the system which comprises passing a liquid medium in heat transfer relation with the gases at one point in the system to extract waste heat from the gases and generate vapor, and then passing the vapor medium in heat transfer relation with the hot gases heated to temperature in excess of that of said vapor at another point in the system thereby adding to such vapor the combined effect of the excess heat extracted from the gases.

15. The method of effecting a gas phase exothermic catalytic reaction which comprises passing a gas stream containing a convertible constituent heated to temperatures in excess of the optimum conversion temperature for said constituent into contact with a body of catalytic material, catalytically causing some but less than commercially complete conversion of the convertible constituent while removing from the gas stream, during contact of the gas with said body of catalytic material, heat sufficient to permit formation of converted constituent, and then contacting the gas stream with a second body of catalytic material to effect conversion of further quantities of unconverted constituent.

16. The method of effecting a gas phase exothermic catalytic reaction which comprises passing a gas stream containing a convertible constituent heated to temperatures in excess of the optimum conversion temperature for said constituent into contact with a body of catalytic material, catalytically causing some but less than commercially complete conversion of the convertible constituent while removing from the gas stream, during contact of the gas with said body of catalytic material, heat enough to permit formation of converted constituent, said amount of removed heat being greater than that generated during contact of said gas with said body of catalytic material and substantially sufficient to reduce the temperature of the gas stream low enough to initiate further conversion by contacting the gas stream with a second body of catalytic material, and then contacting the gas stream with a second body of catalytic material to effect conversion of further quantities of unconverted constituent.

17. The process for converting sulphur dioxide to sulphur trioxide which comprises passing a sulphur dioxide containing gas stream heated to temperatures in excess of the optimum conversion temperature into contact with a body of catalytic material, catalytically causing some but less than commercially complete conversion of sulphur dioxide to sulphur trioxide while removing from the gas stream, during contact of the gas with said body of catalytic material, heat sufficient to permit formation of sulphur trioxide, and then contacting the gas stream with a second body of catalytic material to effect conversion of further quantities of sulphur dioxide to sulphur trioxide.

18. The process for converting sulphur dioxide to sulphur trioxide which comprises passing the sulphur dioxide containing gas stream heated to temperatures in excess of the optimum conversion temperature into contact with a body of catalytic material, catalytically causing some but less than commercially complete conversion of sulphur dioxide to sulphur trioxide while removing from the gas stream during contact of said gas with said body of catalytic material, heat enough to permit formation of sulphur trioxide, said amount of removed heat being greater than that generated during contact of said gas with said body of catalytic material and substantially sufficient to reduce the temperature of the gas stream low enough to initiate further conversion by contacting the gas stream with a second body of catalytic material, and contacting the gas stream with a second body of catalytic material to effect conversion of further quantities of sulphur dioxide to sulphur trioxide.

19. The process of converting sulphur dioxide to sulphur trioxide which comprises passing a sulphur dioxide containing gas heated to a temperature not less than about 650° C. into contact with catalytic material to cause the conversion of the sulphur dioxide to sulphur trioxide, and during the conversion reaction removing heat sufficient to permit formation of commercial yields of sulphur trioxide.

HENRY F. MERRIAM.